US012811683B2

(12) United States Patent
Hu et al.

(10) Patent No.: US 12,811,683 B2
(45) Date of Patent: Nov. 24, 2026

(54) METHOD AND APPARATUS FOR DETECTING PHASE DIFFERENCE AND DELAY OF COHERENT RECEIVER, AND STORAGE MEDIUM

(71) Applicant: Accelink Technologies Co., Ltd., Wuhan (CN)

(72) Inventors: Leilei Hu, Wuhan (CN); Bo Zhang, Wuhan (CN); Qianggao Hu, Wuhan (CN)

(73) Assignee: Accelink Technologies Co., Ltd., Wuhan City (CN)

( * ) Notice: Subject to any disclaimer, the term of this patent is extended or adjusted under 35 U.S.C. 154(b) by 243 days.

(21) Appl. No.: 18/708,687

(22) PCT Filed: Apr. 1, 2022

(86) PCT No.: PCT/CN2022/084735
§ 371 (c)(1),
(2) Date: May 9, 2024

(87) PCT Pub. No.: WO2023/082535
PCT Pub. Date: May 19, 2023

(65) Prior Publication Data
US 2024/0421901 A1 Dec. 19, 2024

(30) Foreign Application Priority Data
Nov. 11, 2021 (CN) ........................ 202111331723.6

(51) Int. Cl.
*H04B 10/079* (2013.01)
*H04B 10/61* (2013.01)

(52) U.S. Cl.
CPC ..... *H04B 10/0799* (2013.01); *H04B 10/0795* (2013.01); *H04B 10/61* (2013.01)

(58) Field of Classification Search
CPC .............................. B60N 2/0284; B60N 2/18; B60N 2002/0216; B64D 11/0639; B64D 25/00;
(Continued)

(56) References Cited

U.S. PATENT DOCUMENTS 5,721,689 A * 2/1998 Hart ...................... G01R 23/16 341/123
6,917,031 B1 * 7/2005 Sun ...................... H04B 10/614 250/214 R
(Continued)

FOREIGN PATENT DOCUMENTS

CN 101388001 A * 3/2009
CN 102511135 A * 6/2012 ......... H04B 10/6165
(Continued)

OTHER PUBLICATIONS

Polarization Related Tests for Coherent Detection Systems (Year: 2008).*
(Continued)

*Primary Examiner* — David C Payne
*Assistant Examiner* — Mohammed Abdelraheem
(74) *Attorney, Agent, or Firm* — Lei Fang, Esq.; Smith Tempel Blaha LLC

(57) ABSTRACT

The embodiments of the present disclosure disclose a method and apparatus for detecting a phase difference and delay of a coherent receiver as well as a storage medium. The method comprises: acquiring a first set of signals and a second set of signals output by the coherent receiver; processing the first set of signals to obtain a first phase difference corresponding to the first set of signals; processing the second set of signals to obtain a second phase difference corresponding to the second set of signals; obtaining a phase difference and delay of the coherent receiver based on the first phase difference and the second phase
(Continued)

difference. By using the above methods, the phase difference and delay detection accuracy of coherent receivers can be improved.

17 Claims, 4 Drawing Sheets

(58) Field of Classification Search
CPC ........................ H04B 10/0795; H04B 10/0799; H04B 10/61; H04B 10/6165
See application file for complete search history.

(56) References Cited

U.S. PATENT DOCUMENTS

| | | | | |
|---|---|---|---|---|
| 8,687,974 | B2 * | 4/2014 | Zelensky | H04B 10/613<br>398/208 |
| 2005/0135521 | A1 * | 6/2005 | Nemer | H04L 27/3872<br>375/350 |
| 2011/0150504 | A1 * | 6/2011 | Ellis | H04B 10/60<br>398/203 |
| 2018/0034554 | A1 * | 2/2018 | Rohde | H04L 7/0075 |

FOREIGN PATENT DOCUMENTS

| | | | | |
|---|---|---|---|---|
| CN | 104426606 A | * | 3/2015 | |
| CN | 109347552 A | * | 2/2019 | H04B 10/0795 |
| CN | 112737674 A | * | 4/2021 | H04B 10/61 |
| CN | 114204987 A | * | 3/2022 | H04B 10/6165 |
| DE | 102013000312 B4 | * | 5/2018 | H04L 27/148 |

OTHER PUBLICATIONS

International Search Report for PCT/CN2022/084735 dated Aug. 11, 2022.

International Written Opinion for PCT/CN2022/084735 dated Aug. 11, 2022.

Liang, Xuerui, The Development of 100Gbit/s DP-QPSL Intergrated Coherent Optical Receiver Based on Planar Lightwave Circuit, China Mater's Theses Full-Text Database, Information Science and Technology, No. 5, May 15, 2014, entire document.

Yuichi Takushima, et al., "Wavelength- and Polarization-Independent Operation of Different M-ary PSK Receiver Based on Single Delay Interferometer Using 120 Optical Hybrid", IEEE Photonics Technology Letters, vol. 21, No. 19, May 15, 2014, ISSN: 1941-0174, pp. 1411-1413.

* cited by examiner

METHOD AND APPARATUS FOR DETECTING PHASE DIFFERENCE AND DELAY OF COHERENT RECEIVER, AND STORAGE MEDIUM

CROSS-REFERENCE

This application is a 371 U.S. National Phase of PCT International Application No. PCT/CN2022/084735 filed on Apr. 1, 2022, which claims a benefit of, and priority to Chinese Patent Disclosure application No. 202111331723.6 filed on Nov. 11, 2021, the disclosure of each of which is hereby expressly incorporated by reference herein in its entirety.

TECHNICAL FIELD OF THE DISCLOSURE

This disclosure relates to the field of optical communication, particularly to a method and apparatus for detecting a phase difference and time delay of a coherent receiver, as well as a storage medium.

BACKGROUND

The coherent technology has been widely applied in the fields of communication and sensing due to its advantages of high sensitivity and long relay distance. In the coherent technology, the receiving end uses an integrated coherent receiver (ICR), the principles of which is that it works by sequentially passing signal light through a polarization beam splitter (PBS), a 90° hybrid, a photo diode (PD), a trans-impedance amplifier (TIA), and a blocking condenser (BC) to convert a modulated optical signal into an analog electrical signal, which is ultimately sent to a digital signal processor (DSP) for demodulation.

Due to reasons regarding processing technology and other reasons, phase angles of the 90° hybrid may not be completely orthogonal, resulting in a phase difference. In addition, there may be a time delay difference between an I-channel signal and a Q-channel signal output by the coherent receiver due to unequal lengths. Therefore, it is necessary to measure the phase difference and time delay of the coherent receiver to reduce errors in subsequent processing of electrical signals.

SUMMARY

In view of this, embodiments of the present disclosure aim to provide a method and apparatus for detecting a phase difference and delay of a coherent receiver, and a storage medium.

In a first aspect, an embodiment of the present disclosure provides a method for detecting a phase difference and delay of a coherent receiver, comprising:

acquiring a first set of signals and a second set of signals output by the coherent receiver, wherein the first set of signals consists of a first signal and a second signal, and the second set of signals consists of a third signal and a fourth signal; and wherein the first set of signals are signals processed by the coherent receiver on one path of optical signal after splitting and another path of optical signal after splitting and then a first frequency shift, and the second set of signals are signals processed by the coherent receiver on the one path of optical signal after splitting and another path of optical signal after splitting and then a second frequency shift, wherein the first frequency shift is different from the second frequency shift;

processing the first set of signals to obtain a first phase difference corresponding to the first set of signals;

processing the second set of signals to obtain a second phase difference corresponding to the second set of signals;

obtaining a phase difference and delay of the coherent receiver based on the first phase difference and the second phase difference.

In some embodiments, the processing the first set of signals to obtain a first phase difference corresponding to the first set of signals, comprises:

performing a cross-correlation operation on the first signal and the second signal to obtain a first cross-correlation result;

performing an autocorrelation operation on the first signal to obtain a first autocorrelation result;

obtaining the first phase difference corresponding to the first set of signals based on the first cross-correlation result and the first autocorrelation result; and the processing the second set of signals to obtain a second phase difference corresponding to the second set of signals, comprises:

performing a cross-correlation operation on the third signal and the fourth signal to obtain a second cross-correlation result;

performing an autocorrelation operation on the third signal to obtain a second autocorrelation result;

obtaining the second phase difference corresponding to the second set of signals based on the second cross-correlation result and the second autocorrelation result.

In some embodiments, the first phase difference is:

$$\varphi_{IQ} = \sin^{-1}(\mathrm{XOR\_IQ1}/\mathrm{XOR\_I1});$$

where $\varphi_{IQ}$ represents the first phase difference, XOR_IQ1 represents the first cross-correlation result, and XOR_I1 represents the first autocorrelation result;

the second phase difference is:

$$\varphi'_{IQ} = \sin^{-1}(\mathrm{XOR\_IQ2}/\mathrm{XOR\_I2}),$$

where $\varphi'_{IQ}$ represents the second phase difference, XOR_IQ2 represents the second cross-correlation result, and XOR_I2 represents the second autocorrelation result.

In some embodiments, the phase difference of the coherent receiver is:

$$\varphi_{Hybrid} = \frac{f_2}{f_2 - f_1}\varphi_{IQ} - \frac{f_1}{f_2 - f_1}\varphi'_{IQ},$$

where $\varphi_{Hybrid}$ represents the phase difference, $f_1$ represents the first frequency shift, and $f_2$ represents the second frequency shift, $\varphi_{IQ}$ represents the first phase difference, $\varphi'_{IQ}$ represents the second phase difference.

In some embodiments, the delay of the coherent receiver is:

$$\tau = \frac{\varphi'_{IQ} - \varphi_{IQ}}{f_2 - f_1},$$

where $\tau$ represents the delay, $f_1$ represents the first frequency shift, $f_2$ represents the second frequency shift, $\varphi_{IQ}$ represents the first phase difference, and $\varphi'_{IQ}$ represents the second phase difference.

In some embodiments, the method further comprises:

processing the first set of signals to obtain a third phase difference corresponding to the first set of signals;

processing the second set of signals to obtain a fourth phase difference corresponding to the second set of signals;

the obtaining the delay of the coherent receiver based on the first phase difference and the second phase difference, comprising:

obtaining the delay of the coherent receiver based on the first phase difference, the second phase difference, the third phase difference, and the fourth phase difference.

In some embodiments, the obtaining the delay of the coherent receiver based on the first phase difference, the second phase difference, the third phase difference, and the fourth phase difference, comprises:

obtaining a first delay based on the first phase difference and the second phase difference;

obtaining a second delay based on the third phase difference and the fourth phase difference;

determining a mean of the first delay and the second delay as the delay of the coherent receiver.

In some embodiments, the processing the first set of signals to obtain a third phase difference corresponding to the first set of signals, comprises:

performing a cross-correlation operation on the first signal and the second signal to obtain a third cross-correlation result;

performing an autocorrelation operation on the second signal to obtain a third autocorrelation result;

obtaining the third phase difference based on the third cross-correlation result and the third autocorrelation result; and the processing the second set of signals to obtain a fourth phase difference corresponding to the second set of signals, comprises:

performing a cross-correlation operation on the third signal and the fourth signal to obtain a fourth cross-correlation result;

performing an autocorrelation operation on the fourth signal to obtain a fourth autocorrelation result;

obtaining the fourth phase difference based on the fourth cross-correlation result and the fourth autocorrelation result.

In some embodiments, a polarization state of the one path of optical signal after splitting is different from that of the another path of optical signal after splitting and then the first frequency shift; and the polarization state of the one path of optical signal after splitting is different from that of the another path of optical signal after splitting and then the second frequency shift.

In some embodiments, a sampling frequency of the first set of signals are an integer multiple of the first frequency shift and a sampling frequency of the second set of signals are an integer multiple of the second frequency shift.

In some embodiments, the first set of signals and the second set of signals are signals normalized by amplitude.

In a second aspect, an embodiment of the present disclosure provides an apparatus for detecting a phase difference and delay of a coherent receiver, comprising:

an acquisition module for acquiring a first set of signals and a second set of signals output by the coherent receiver, wherein the first set of signals consists of a first signal and a second signal, and the second set of signals consists of a third signal and a fourth signal; and wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

a first processing module for processing the first set of signals to obtain a first phase difference corresponding to the first set of signals, and processing the second set of signals to obtain a second phase difference corresponding to the second set of signals;

an obtaining module for obtaining a phase difference and delay of the coherent receiver based on the first phase difference and the second phase difference.

In some embodiments, the first processing module is further used for performing a cross-correlation operation on the first signal and the second signal to obtain a first cross-correlation result, performing an autocorrelation operation on the first signal to obtain a first autocorrelation result, obtaining a first phase difference corresponding to the first set of signals based on the first cross-correlation result and the first autocorrelation result, performing a cross-correlation operation on the third signal and the fourth signal to obtain a second cross-correlation result, performing an autocorrelation operation on the third signal to obtain a second autocorrelation result, and obtaining a second phase difference corresponding to the second set of signals based on the second cross-correlation result and the second autocorrelation result.

In some embodiments, the first phase difference is:

$$\varphi_{IQ} = \sin^{-1}(\mathrm{XOR\_IQ1}/\mathrm{XOR\_I1}),$$

where $\varphi_{IQ}$ represents the first phase difference, XOR_IQ1 represents the first cross-correlation result, and XOR_I1 represents the first autocorrelation result; and the second phase difference is:

$$\varphi'_{IQ} = \sin^{-1}(\mathrm{XOR\_IQ2}/\mathrm{XOR\_I2}),$$

where $\varphi'_{IQ}$ represents the second phase difference, XOR_IQ2 represents the second cross-correlation result, and XOR_I2 represents the second autocorrelation result.

In some embodiments, the phase difference of the coherent receiver is:

$$\varphi_{Hybrid} = \frac{f_2}{f_2 - f_1}\varphi_{IQ} - \frac{f_1}{f_2 - f_1}\varphi'_{IQ},$$

where $\varphi_{Hybrid}$ represents the phase difference, $f_1$ represents the first frequency shift, and $f_2$ represents the second frequency shift, $\varphi_{IQ}$ represents the first phase difference, and $\varphi'_{IQ}$ represents the second phase difference.

In some embodiments, the delay of the coherent receiver is:

$$\tau = \frac{\varphi'_{IQ} - \varphi_{IQ}}{f_2 - f_1},$$

where $\tau$ represents the delay, $f_1$ represents the first frequency shift, $f_2$ represents the second frequency shift, $\varphi_{IQ}$ represents the first phase difference, $\varphi'_{IQ}$ represents the second phase difference.

In some embodiments, the apparatus further comprises:

a second processing module for processing the first set of signals to obtain a third phase difference corresponding to the first set of signals, and processing the second set of signals to obtain a fourth phase difference corresponding to the second set of signals;

the obtaining module is further used to obtain a delay of the coherent receiver based on the first phase difference, the second phase difference, the third phase difference, and the fourth phase difference.

In some embodiments, the obtaining module is further used to obtain a first delay based on the first phase difference and the second phase difference, obtaining a second delay based on the third phase difference and the fourth phase difference, and determining a mean of the first delay and the second delay as the delay of the coherent receiver.

In some embodiments, the second processing module is further used for performing a cross-correlation operation on the first signal and the second signal to obtain a third cross-correlation result, performing an autocorrelation operation on the second signal to obtain a third autocorrelation result, obtaining the third phase difference based on the third cross-correlation result and the third autocorrelation result, performing a cross-correlation operation on the third signal and the fourth signal to obtain a fourth cross-correlation result, performing an autocorrelation operation on the fourth signal to obtain a fourth autocorrelation result, and obtaining the fourth phase difference based on the fourth cross-correlation result and the fourth autocorrelation result.

In a third aspect, an embodiment of the present disclosure provides an apparatus for detecting a phase difference and delay of a coherent receiver, comprising:

a memory used to store computer executable instructions;

a processor connected to the memory for implementing the method described in the first aspect by executing the computer executable instructions.

In a fourth aspect, an embodiment of the present disclosure provides a computer-executable storage medium, wherein the computer storage medium stores computer-executable instructions thereon; and after the computer executable instructions are executed by a processor, the method described in the first aspect is capable of being implemented.

The technical solution provided in the disclosed embodiments may comprise the following beneficial effects:

in the disclosed embodiments, based on the first set of signals and the second set of signals output by the coherent receiver, the first set of signals and the second set of signals are processed respectively to obtain the first phase difference corresponding to the first set of signals and the second phase difference corresponding to the second set of signals; based on the first phase difference and the second phase difference, the phase difference and delay of the coherent receiver are obtained without the need for additional compensation units, thereby simplifying the phase difference and delay detection steps of the coherent receiver while improving its phase difference and delay detection accuracy.

It should be understood that the general description above and the detailed description in the following text are only illustrative and explanatory, and does not limit this disclosure.

DETAILED DESCRIPTION

The following provides a further detailed explanation of the disclosed technical solution in conjunction with the accompanying drawings and specific implementation examples.

Coherent receivers are important optical devices based on planar optical waveguide integration technology. The basic principle of a coherent receiver is that the received signal light and local oscillator light are separated into two paths of single polarized light through a polarization beam splitter. The single polarized signal light and local oscillator light are mixed through a hybrid, and then converted into amplified electrical signals through a detector and a trans-impedance amplifier. The optical signal is divided into four pairs of channels from entering the coherent receiver till the output of the electrical signal. In theory, these channels follow the same path and there is no phase difference or time delay problem. However, in actual devices, due to processing technology and other reasons, the phase difference of the hybrid may not be completely orthogonal; that is, there may be phase differences. In addition, there may be differences in the path length of coherent receivers, resulting in time delays in the signals transmitted through each channel. Previous studies have shown that the phase difference and time delay difference generated can have a significant impact on the performance of coherent receivers. Therefore, how to accurately detect the phase difference and time delay of coherent receivers is a key problem that must be solved.

Figure 1:
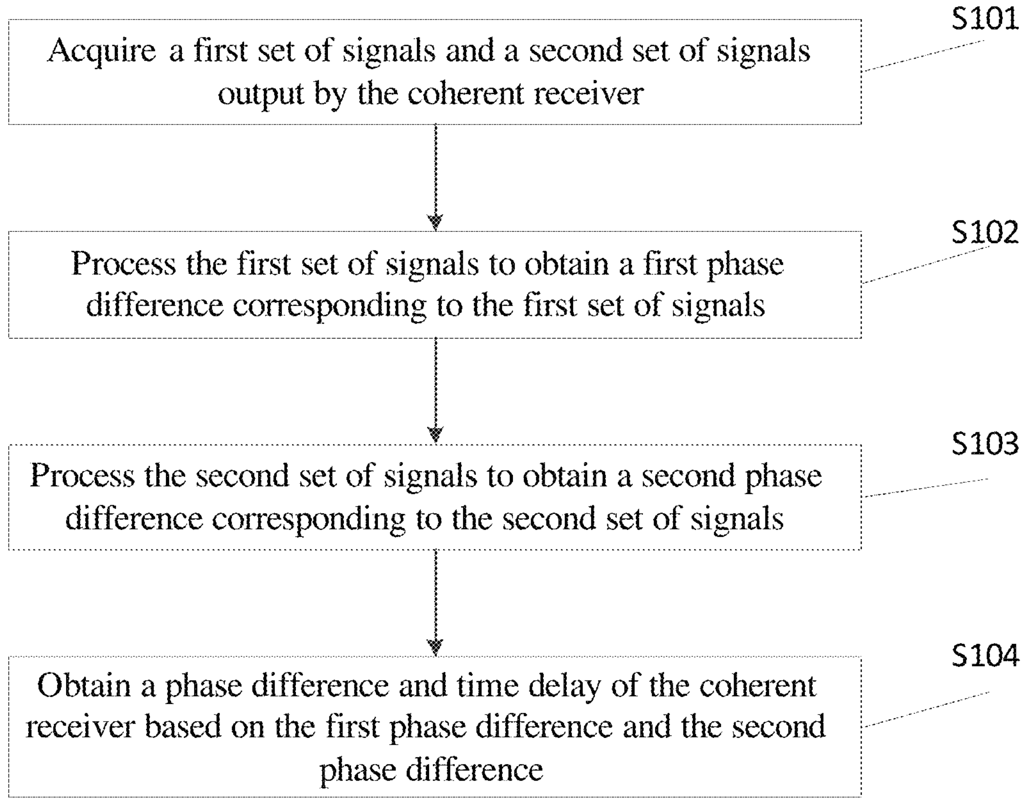
FIG. 1 is a first flowchart of a method for detecting a phase difference and delay of a coherent receiver according to an embodiment of the present disclosure.

In this regard, the present disclosure provides a method for detecting a phase difference and delay of a coherent receiver. FIG. 1 shows a first flowchart of a method for detecting a phase difference and delay of a coherent receiver according to an embodiment of the present disclosure. As shown in FIG. 1, the method for detecting a phase difference and delay of a coherent receiver comprises the following steps:

S101. acquiring a first set of signals and a second set of signals output by the coherent receiver, wherein the first set of signals consists of a first signal and a second signal, and the second set of signals consists of a third signal and a fourth signal; wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

S102. processing the first set of signals to obtain a first phase difference corresponding to the first set of signals;

S103. processing the second set of signals to obtain a second phase difference corresponding to the second set of signals;

S104. obtaining a phase difference and delay of the coherent receiver based on the first phase difference and the second phase difference.

In an embodiment of the present disclosure, one path of optical signal and another path of optical signal are two paths of optical signals generated by a laser and separated by a coupler. The coherent receiver converts the two paths of input optical signals into electrical signals. In this disclosure, an oscilloscope can be used to collect the electrical signals output by the coherent receiver, that is, to obtain the first set of signals and the second set of signals in step S101.

In some embodiments, the first set of signals and the second set of signals are amplitude normalized electrical signals.

In this embodiment, by normalizing the amplitudes of the first set of signals and the second set of signals, the accuracy of phase difference and delay operation for the coherent receiver can be improved by calculating the first set of signals and the second set of signals under the same measurement standard.

In an embodiment of the present disclosure, the another path of optical signal after splitting is input to a frequency shifter for frequency shift processing to obtain the another path of optical signal after splitting and then the first frequency shift and the another path of after splitting and then the second frequency shift in step S101. For example, by setting different frequency shift parameters for the frequency shifter, the first and second frequency shifts are different.

In some embodiments, a polarization state of the one path of optical signal after splitting is different from that of the another path of optical signal after splitting and then the first frequency shift, and a polarization state of the one path of optical signal after splitting is different from that of the another path of optical signal after splitting and then the second frequency shift.

In this embodiment, the polarization of the input optical signal is controllable by a polarization controller to obtain optical signals in different polarization states. The optical signals in different polarization states are collected by an oscilloscope after passing through a coherent receiver to obtain the first set of signals and the second set of signals disclosed in this disclosure.

It should be noted that in an embodiment of the present disclosures, different polarization states of the optical signal are set to alleviate the problem that a RF signal output by a coherent receiver is weak due to the alignment of incident light with any polarization direction. This can improve the accuracy of the acquisition of the first set of signals and the second signal in the present disclosure, thereby reducing the impact on phase difference and delay operation.

Figure 2:
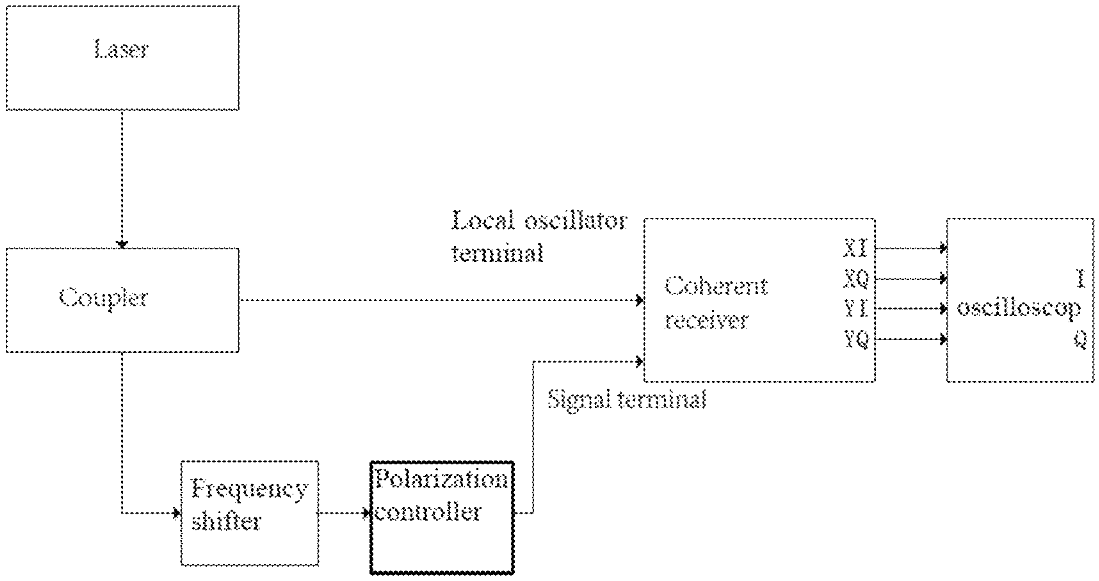
FIG. 2 is an example diagram of a processing process from optical signals to electrical signals disclosed in this disclosure.

FIG. 2 shows an example of a processing process from an optical signal to an electrical signal disclosed in the present disclosure. As shown in FIG. 2, a laser, which is connected to a coupler, emits an optical signal. The coupler splits the optical signal to obtain one path of optical signal and another path of optical signal in step S101. The one path of optical signal after splitting is input into a local oscillator terminal of the coherent receiver, while the another path of optical signal after splitting is input into an signal terminal of the coherent receiver through a frequency shifter and a polarization controller for frequency shifting and polarization processing. As shown in FIG. 2, the four output terminals of the coherent receiver comprise four electrical signals: XI, XQ, YI, and YQ, where XI represents an I-channel electrical signal of the X-polarized state, XQ represents a Q-channel electrical signal of the X-polarized state, YI represents an I-channel electrical signal of the Y-polarized state, and YQ represents a Q-channel electrical signal of the Y-polarized state. A real-time oscilloscope is connected to the output terminal of the coherent receiver, and the output signal of the coherent receiver is sampled and processed to obtain the I-channel signal and Q-channel signal.

In an embodiment of the present disclosure, the I-channel signal and Q-channel signal output by the coherent receiver correspond to the first signal and second signal resulted from one path of optical signal after splitting and another path of optical signal after splitting and then a first frequency shift in an embodiment of the present disclosure, and the I-channel signal and Q-channel signal output by the coherent receiver also correspond to the third and fourth signals obtained by processing one path of optical signal after splitting and another path of optical signal after splitting and then a second frequency shift in this disclosure.

It should be noted that in an embodiment of the present disclosure, if the first signal may be either an I-channel signal or a Q-channel signal, the corresponding second signal is the other of the I-channel and Q-channel signals except of the first signal. Similarly, the third signal can also be an I-channel signal or a Q-channel signal, and correspondingly, the fourth signal is the other of the I-channel and Q-channel signals except of the third signal.

As mentioned earlier, the one path of optical signal after splitting and the another path of optical signal after splitting and then the frequency shift are processed by a coherent receiver. Herein, the coherent receiver comprises a 90° hybrid, a photo diode, a trans-impedance amplifier, and a blocking condenser. The two paths of input optical signals are processed sequentially through the above components in the coherent receiver, thereby outputting the electrical signals included in the first set of signals and the second set of signals mentioned above.

The output of the two paths of input optical signals through the 90° hybrid follows a formula (1) below:

$$\begin{pmatrix} E_{1,out} \\ E_{2,out} \\ E_{3,out} \\ E_{4,out} \end{pmatrix} = \frac{1}{2}\begin{bmatrix} 1 & 1 \\ 1 & -1 \\ 1 & j*\exp(\varphi_{Hybrid}) \\ 1 & -j*\exp(\varphi_{Hybrid}) \end{bmatrix}\begin{pmatrix} E_{1,in} \\ E_{2,in} \end{pmatrix}, \quad (1)$$

where $E_{1,in}$, $E_{2,in}$ are the two paths of input signals of the hybrid, and $E_{1,out}$~$E_{4,out}$ are the four output signals of the hybrid, $\varphi_{Hybrid}$ is a phase difference of the hybrid, which is the phase difference of the coherent receiver to be detected in this disclosure.

The two paths of input signals of the coherent receiver are processed by a hybrid and output to the photo diode, trans-impedance amplifier, and blocking condenser. The I-channel signal and the Q-channel signal both output by the coherent receiver, which are sampled by an oscilloscope, can be represented by the following formulas (2) and (3):

$$V_I \propto \sqrt{P_{1,in}*P_{2,in}}*\sin(2\pi\Delta ft+\theta_n), \text{ and} \quad (2)$$

$$V_Q \propto \sqrt{P_{1,in}*P_{2,in}}*\cos(2\pi\Delta ft+\theta_n+\varphi_{Hybrid}+\Delta f*\tau), \quad (3)$$

where ∝ represents positive correlation, Δf represents a frequency shift, τ represents a time delay between the I-channel signal and the Q-channel signal, and $\theta_n$ represents a noise term introduced by factors such as thermal noise generated by the laser itself and unstable driving signal noise.

In some embodiments, in step S102, processing the first set of signals to obtain the first phase difference corresponding to the first set of signals, comprises:

performing a cross-correlation operation on the first signal and the second signal to obtain a first cross-correlation result; performing an autocorrelation operation on the first signal to obtain a first autocorrelation result; and obtaining the first phase difference corresponding to the first set of signals based on the first cross-correlation result and the first autocorrelation result.

In step S103, processing the second set of signals to obtain the second phase difference corresponding to the second set of signals, comprises:

performing a cross-correlation operation on the third signal and the fourth signal to obtain a second cross-correlation result; performing an autocorrelation operation on the third signal to obtain a second autocorrelation result; obtaining the second phase difference corresponding to the second set of signals based on the second cross-correlation result and the second autocorrelation result.

In an embodiment of the present disclosure, the first phase difference and the second phase difference are determined through autocorrelation and cross-correlation operations.

Illustratively, it is assumed that the first signal in step S101 is the I-channel signal, and the second signal in step S101 is the Q-channel signal. Set the first frequency shift to be $f_1$, perform a cross-correlation operation on the sampling results VI and VQ of the I-channel and Q-channel signals, and obtain the first cross-correlation result. The following formula (4) is a way to perform cross-correlation operations on the first and second signals:

$$\text{CORR}_{IQ1} \propto \sum_{i=0}^{N} P_{1,in}*P_{2,in}*\sin(\varphi_{Hybrid}+f_1*\tau) + \quad (4)$$

-continued $$P_{1,in}*P_{2,in}\sum_{i=0}^{N}\cos(4\pi f_1 t_s+2*\theta_n(t_s)+\varphi_{Hybrid}+f_1*\tau),$$

where ∝ represents positive correlation, N represents the total number of sampling points, $P_{1,in}$, and $P_{2,in}$ represent the input power of I-channel and Q-channel signals, and $t_s$ represents the actual sampling time.

The relationship between the sampling time $t_s$ and a sampling frequency is shown in formula (5) as follows:

$$t_s = t_0 + \frac{i}{f_s} \quad (5)$$

where $f_s$ represents the sampling frequency of the oscilloscope, and to represents the starting time of sampling.

The following formula (6) is a way used to perform the autocorrelation operation on the sampling result VI of the I-channel signal:

$$\text{CORR}_{II1} \propto \sum_{i=0}^{N} P_{1,in}*P_{2,in} - P_{1,in}*P_{2,in}\sum_{i=0}^{N}\cos(4\pi f_1 t+2*\theta_n(t_s)) \quad (6)$$

Illustratively, it is assumed that the third signal in step S101 is the I-channel signal, and the fourth signal in step S101 is the Q-channel signal. Set the second frequency shift to be $f_2$ and perform the cross-correlation operation on the sampling results VI and VQ of the I-channel and Q-channel signals to obtain the second cross-correlation result. The following formula (7) is a way to perform the cross-correlation operation on the third and fourth signals:

$$\text{CORR}_{IQ2} \propto \sum_{i=0}^{N} P_{1,in}*P_{2,in}*\sin(\phi_{Hybrid}+f_2*\tau) + P_{1,in}*P_{2,in}\sum_{i=0}^{N}\cos(4\pi f_2 t_s+2*\theta_n(t_s)+\varphi_{Hybrid}+f_2*\tau) \quad (7)$$

The definition of parameters in formula (7) can refer to the definition of parameters in formula (4).

The following formula (8) is the way used to perform the autocorrelation operation on the sampling result VI of the I-channel signal:

$$\text{CORR}_{II2} \propto \sum_{i=0}^{N} P_{1,in}*P_{2,in} - P_{1,in}*P_{2,in}\sum_{i=0}^{N}\cos(4\pi f_2 t+2*\theta_n(t_s)) \quad (8)$$

In some embodiments, a sampling frequency of the first set of signals is an integer multiple of the first frequency shift, and a sampling frequency of the second set of signals is an integer multiple of the second frequency shift.

In an embodiment of the present disclosure, in calculating the first cross-correlation result and the first autocorrelation result, the sampling frequency of the first set of signals is set to an integer multiple of the first frequency shift, and the sampling frequency of the second signal is set to an integer multiple of the second frequency shift to remove the noise term $\theta_n$.

Illustratively, setting the sampling frequency of the oscilloscope $f_s$=4*$f_1$, the second term $$P_{1,in}*P_{2,in}\sum_{i=0}^{N}\cos(4\pi f_1 t_s+2*\theta_n(t_s)+\varphi_{Hybrid}+f_1*\tau)$$

on the right side of formula (4) mentioned above has an integration result approaching zero over time, and the second term $$P_{1,in}*P_{2,in}\sum_{i=0}^{N}\cos(4\pi f_1 t+2*\theta_n(t_s))$$

on the right side of formula (6) has an integration result approaching zero over time, namely the first cross-correlation result and the first autocorrelation result with the noise term $\theta_n$ removed are obtained and represented by the following formulas (9) and (10), respectively:

$$\text{CORR}_{IQ1}\propto\sum_{i=0}^{N}P_{1,in}*P_{2,in}*\sin(\varphi_{Hybrid}+f_1*\tau) \tag{9}$$

$$\text{CORR}_{II1}\propto\sum_{i=0}^{N}P_{1,in}*P_{2,in} \tag{10}$$

Similarly, in calculating the second cross-correlation result and the second autocorrelation result, illustratively, setting the sampling frequency of the oscilloscope $f_s=4*f_2$, the second term $$P_{1,in}*P_{2,in}\sum_{i=0}^{N}\cos(4\pi f_2 t_s+2*\theta_n(t_s)+\varphi_{Hybrid}+f_2*\tau)$$

on the right side of formula (7) mentioned above has an integration result approaching zero over time, and the second term $$P_{1,in}*P_{2,in}\sum_{i=0}^{N}\cos(4\pi f_2 t+2*\theta_n(t_s))$$

on the right side of formula (8) has an integration result approaching zero over time, namely the second cross-correlation result and the second autocorrelation result with the noise term $\theta_n$ removed are obtained and represented by the following formulas (11) and (12), respectively:

$$\text{CORR}_{IQ2}\propto\sum_{i=0}^{N}P_{1,in}*P_{2,in}*\sin(\varphi_{Hybrid}+f_2*\tau) \tag{11}$$

$$CORR_{II2}\propto\sum_{i=0}^{N}P_{1,in}*P_{2,in} \tag{12}$$

In some embodiments, the first phase difference $\varphi_{IQ1}$ can be obtained by using formulas (9) and (10) above and is represented by a following formula (13):

$$\varphi_{IQ1}=\varphi_{Hybrid}+f_1*\tau=\sin^{-1}\left(\frac{\text{CORR}_{IQ1}}{\text{CORR}_{II1}}\right) \tag{13}$$

Similarly, the second phase difference $\phi_{IQ2}$ can be obtained through formulas (13) and (14) above and is represented by a following formula (14):

$$\varphi_{IQ2}=\varphi_{Hybrid}+f_2*\tau=\sin^{-1}\left(\frac{\text{CORR}_{IQ2}}{\text{CORR}_{II2}}\right) \tag{14}$$

In some embodiments, the phase difference $\varphi_{Hybrid}$ of the coherent receiver can be obtained by the first phase difference in formula (13) and the second phase difference in formula (14) and is represented by a following formula (15):

$$\varphi_{Hybrid}=\frac{f_2}{f_2-f_1}\varphi_{IQ1}-\frac{f_1}{f_2-f_1}\varphi_{IQ2} \tag{15}$$

In some embodiments, the time delay $\tau$ of the coherent receiver can be obtained by using the first phase difference in formula (13) and the second phase difference in formula (14), and is represented by a following formula (16):

$$\tau=\frac{\varphi_{IQ2}-\varphi_{IQ1}}{f_2-f_1} \tag{16}$$

In this embodiment, $\tau$ may comprise the time delay of the coherent receiver processing the first set of signals and the second set of signals (i.e. the time delay of the coherent receiver itself), as well as the time delay of the oscilloscope collecting the first set of signals and the second set of signals (i.e. the time delay of the detection line).

In the embodiments of the present disclosure, the first set of signals and the second set of signals output by the coherent receiver are processed to obtain the first and second phase differences, and the phase difference and time delay of the coherent receiver are obtained based on the first and second phase differences. That is to say, a method for detecting the phase difference and time delay of the coherent receiver disclosed in the embodiments of the present disclosure does not require calculating the self phase and wavelength of each signal, nor does it require additional compensation devices, thereby simplifying the detection steps of the phase difference and time delay of the coherent receiver, and having high detection accuracy.

Figure 3:
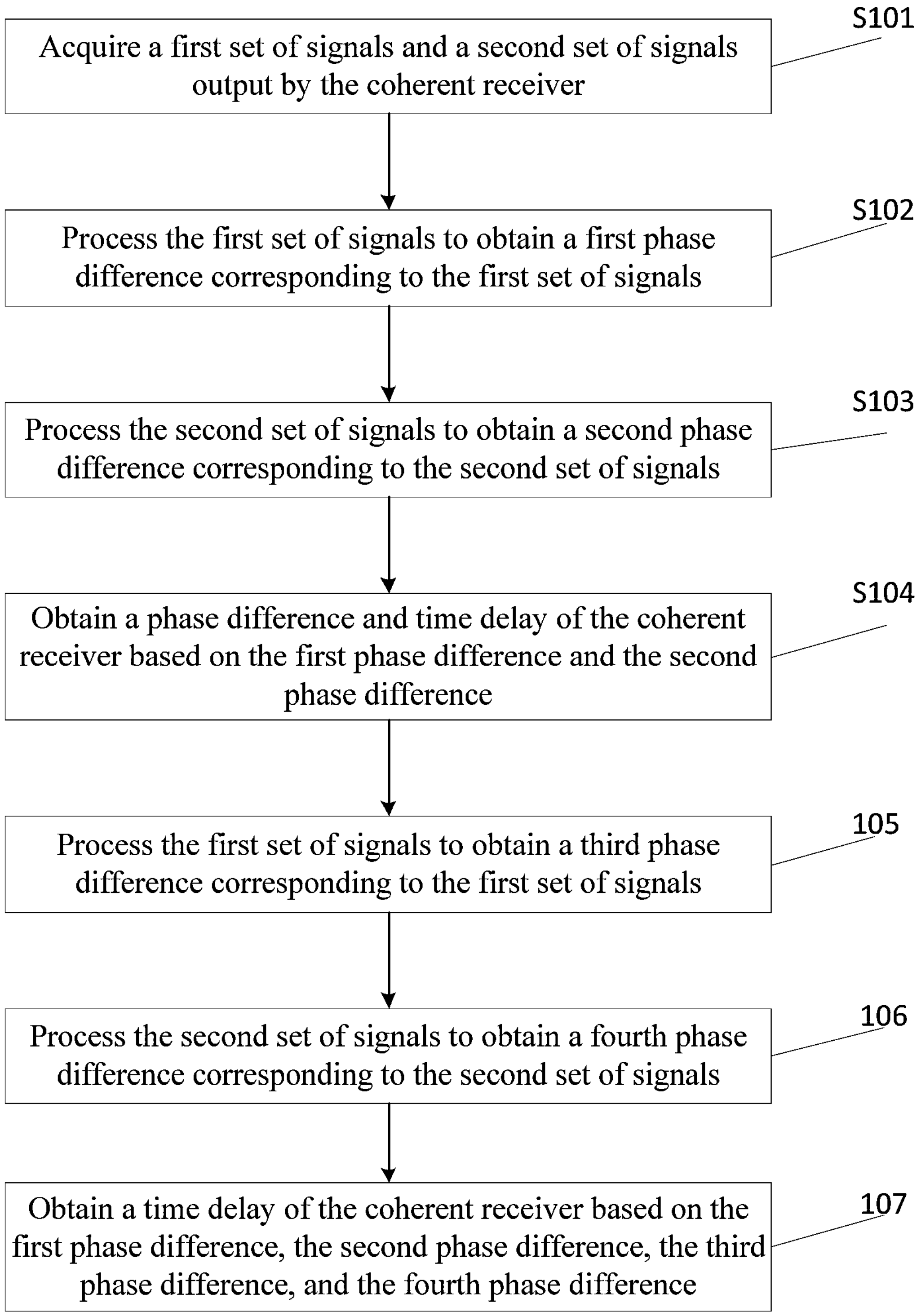
FIG. 3 is a second flowchart of a method for detecting a phase difference and delay of a coherent receiver according to an embodiment of the present disclosure.

In some embodiments, FIG. 3 illustrates a second flowchart of a time delay detection method for a coherent receiver of an embodiment of the present disclosure. As shown in FIG. 3, the method further comprises:

S105. processing the first set of signals to obtain a third phase difference corresponding to the first set of signals;

S106. processing the second set of signals to obtain a fourth phase difference corresponding to the second set of signals;

S107. obtaining a time delay of the coherent receiver based on the first phase difference, the second phase difference, the third phase difference, and the fourth phase difference.

In an embodiment of the present disclosure, considering that the oscilloscope generates a detection-line time delay when sampling the first set of signals and the second set of signals processed by the coherent receiver, i.e. the time delay obtained from formula (16) in the previous embodiment comprises the detection-line time delay and the coherent receiver self-time-delay, which can be represented by a following formula (17):

$$\tau=\tau_{ICR}+\tau_{Link} \tag{17}$$

where $\tau_{ICR}$ represents the self-time-delay of the coherent receiver, and $\tau_{Link}$ represents the detection of line time delay.

To avoid the impact of the detection-line time delay on the subsequent processing of output signals from the coherent receiver, this disclosure involves swapping the RF cable connecting the output terminal of the coherent receiver to the RF cables for the I-channel signal and Q-channel signal, as well as the input port of the oscilloscope, and the first set of signals and the second set of signals are further processed to obtain the third and fourth phase differences and then the time delay of the coherent receiver is obtained based on the first phase difference, second phase difference, third phase difference, and fourth phase difference.

It should be noted that in this embodiment, the time delay represents the time delay of the coherent receiver in processing the first set of signals and the second set of signals (i.e. the time delay of the coherent receiver itself), and does not comprise the time delay of collecting the first set of signals and the second set of signals (i.e. the time delay of detection line). That is to say, in this embodiment, the time delay is the coherent receiver's own time delay in which the detection-line time delay has been removed.

It can be understood that in this disclosure, the above method not only eliminates the need to calculate the phase and wavelength of each signal itself, nor does it require additional compensation devices, thereby simplifying the time delay detection steps of coherent receiver. Furthermore, the time delay obtained in this embodiment eliminates the detection-line time delay, further improving the time delay detection accuracy of coherent receiver.

In some embodiments, in step S105, processing the first set of signals to obtain a third phase difference corresponding to the first set of signals, comprises:

- performing a cross-correlation operation on the first signal and the second signal to obtain a third cross-correlation result;
- performing an autocorrelation operation on the second signal to obtain a third autocorrelation result;
- obtaining a third phase difference based on the third cross-correlation result and the third autocorrelation result.

In step S106, processing the second set of signals to obtain the fourth phase difference corresponding to the second set of signals, comprises:

- performing a cross-correlation operation on the third signal and the fourth signal to obtain a fourth cross-correlation result;
- performing an autocorrelation operation on the fourth signal to obtain a fourth autocorrelation result;
- obtaining the fourth phase difference based on the fourth cross-correlation result and the fourth autocorrelation result.

The calculation functions of the third cross-correlation result, the third autocorrelation result, the fourth cross-correlation result, and the fourth autocorrelation result are the same as those of the first cross-correlation result, the first autocorrelation result, the second cross-correlation result, and the second autocorrelation result in the previous embodiment, which all are performed based on the cross-correlation function and autocorrelation function on the third and fourth signals, and will not be elaborated here.

Illustratively, the third phase difference $\varphi_{IQ3}$ and the fourth phase difference $\varphi_{IQ4}$ can be represented by following formulas (18) and (19) respectively:

$$\varphi_{IQ3} = \varphi_{Hybrid} + f_1 * \tau_2 = \sin^{-1}\left(\frac{\mathrm{CORR}_{IQ3}}{\mathrm{CORR}_{QQ3}}\right) \tag{18}$$

-continued $$\varphi_{IQ4} = \varphi_{Hybrid} + f_2 * \tau_2 = \sin^{-1}\left(\frac{\mathrm{CORR}_{IQ4}}{\mathrm{CORR}_{QQ4}}\right) \tag{19}$$

where $\mathrm{CORR}_{IQ3}$ represents the third cross-correlation result, $\mathrm{CORR}_{QQ3}$ represents the third autocorrelation result, $\mathrm{CORR}_{IQ4}$ represents the fourth cross-correlation result, and $\mathrm{CORR}_{QQ4}$ represents the fourth autocorrelation result, $\varphi_{Hybrid}$ represents the phase difference of the coherent receiver, and $\tau_2$ represents the second time delay.

In some embodiments, obtaining the time delay of the coherent receiver based on the first phase difference, the second phase difference, the third phase difference, and the fourth phase difference, comprises:

- obtaining a first time delay based on the first phase difference and the second phase difference;
- obtaining a second time delay based on the third phase difference and the fourth phase difference;
- determining a mean of the first time delay and the second time delay as the time delay of the coherent receiver.

It should be noted that in the embodiments of the present disclosure, the first time delay refers to the time delay in formula (16) mentioned above, which comprises the time delay of the detection line and the time delay of the coherent receiver itself, and for example, is represented by $\tau_1$.

In this disclosure, when calculating and obtaining the second time delay based on the third and fourth phase differences, the aforementioned method can be referred to and the obtained second time delay can be represented by the following formula (20):

$$\tau_2 = \frac{\varphi_{IQ4} - I_{IQ3}}{f_2 - f_1} \tag{20}$$

In this embodiment, in order to avoid the impact of detection-line time delay on the subsequent processing of output signals from the coherent receiver, the RF cable of the output terminal of the coherent receiver connecting the I-channel signal and Q-channel signal, and the input port of the oscilloscope are swapped. Therefore, the obtained second time delay can be represented by a following formula (21):

$$\tau_2 = \tau_{ICR} - \tau_{Link} \tag{21}$$

According to the first time delay $\tau_1$ and second time delay $\tau_2$ as well as the aforementioned formulas (17) and (21), the time delay of the coherent receiver itself can be obtained and represented by a following formula (22):

$$\tau = \frac{\tau_1 + \tau_2}{2} \tag{22}$$

where $\tau$ eliminates the detection-line time delay, which is the self-time-delay of the coherent receiver.

Figure 4:
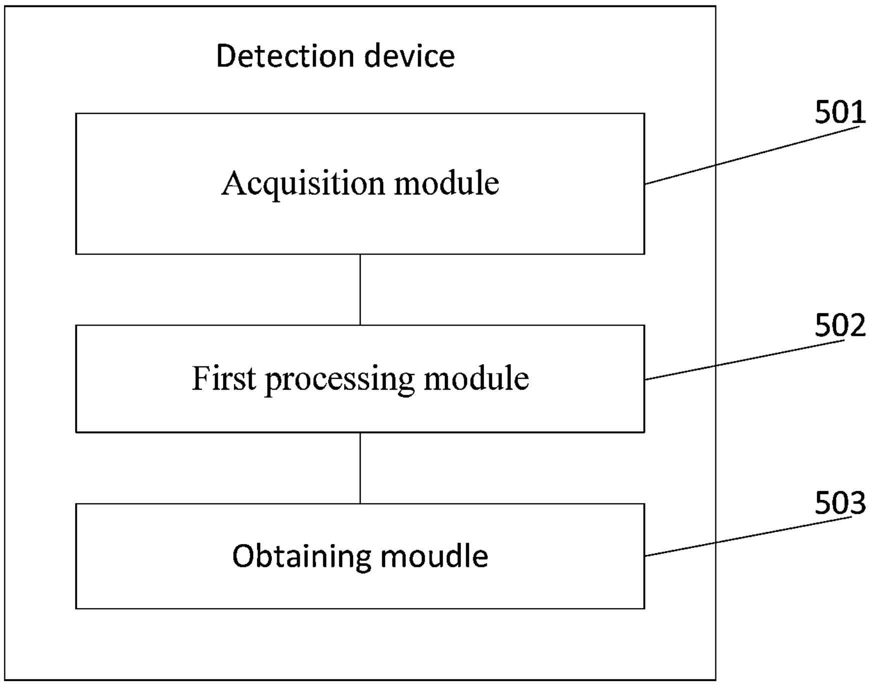
FIG. 4 is a first diagram of an apparatus for detecting a phase difference and delay of a coherent receiver according to an embodiment of the present disclosure.

FIG. 4 shows a first diagram of an apparatus for detecting a phase difference and time delay of a coherent receiver according to an embodiment of the present disclosure, the apparatus comprising:

- an acquisition module 501 for acquiring a first set of signals and a second set of signals output by the coherent receiver, wherein the first set of signals consists of a first signal and a second signal, and the second set of signals consists of a third signal and a fourth signal; wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

a first processing module 502 used to process the first set of signals to obtain a first phase difference corresponding to the first set of signals, and process the second set of signals to obtain a second phase difference corresponding to the second set of signals;

an obtaining module 503 for obtaining a phase difference and time delay of the coherent receiver based on the first phase difference and the second phase difference.

In some embodiments, the first processing module 502 is further used for performing a cross-correlation operation on the first signal and the second signal to obtain a first cross-correlation result; performing an autocorrelation operation on the first signal to obtain a first autocorrelation result; obtaining the first phase difference corresponding to the first set of signals based on the first cross-correlation result and the first autocorrelation result; performing a cross-correlation operation on the third signal and the fourth signal to obtain a second cross-correlation result; performing an autocorrelation operation on the third signal to obtain a second autocorrelation result; and obtaining the second phase difference corresponding to the second set of signals based on the second cross-correlation result and the second autocorrelation result.

In some embodiments, the first phase difference $\varphi_{IQ}$ is represented by a following formula (23):

$$\varphi_{IQ} = \sin^{-1}(\text{XOR\_IQ1}/\text{XOR\_I1}) \tag{23}$$

where XOR_IQ1 represents the first cross-correlation result, and XOR_I1 represents the first autocorrelation result; and the second phase difference $\varphi'_{IQ}$ is represented by a following formula (24):

$$\varphi'_{IQ} = \sin^{-1}(\text{XOR\_IQ2}/\text{XOR\_I2}) \tag{24}$$

where XOR_IQ2 represents the second cross-correlation result, and XOR_I2 represents the second autocorrelation result.

In some embodiments, the phase difference of the coherent receiver is represented by a following formula (25):

$$\varphi_{Hybrid} = \frac{f_2}{f_2 - f_1}\varphi_{IQ} - \frac{f_1}{f_2 - f_1}\varphi'_{IQ} \tag{25}$$

where $\varphi_{Hybrid}$ represents the phase difference, $f_1$ represents the first frequency shift, $f_2$ represents the second frequency shift, $\varphi_{IQ}$ represents the first phase difference, and $\varphi'_{IQ}$ represents the second phase difference.

In some embodiments, the time delay of the coherent receiver is represented by a following formula (26):

$$\tau = \frac{\varphi'_{IQ} - \varphi_{IQ}}{f_2 - f_1} \tag{26}$$

where $\tau$ represents the time delay, $f_1$ represents the first frequency shift, $f_2$ represents the second frequency shift, $\varphi_{IQ}$ represents the first phase difference, and $\varphi'_{IQ}$ represents the second phase difference.

Figure 5:
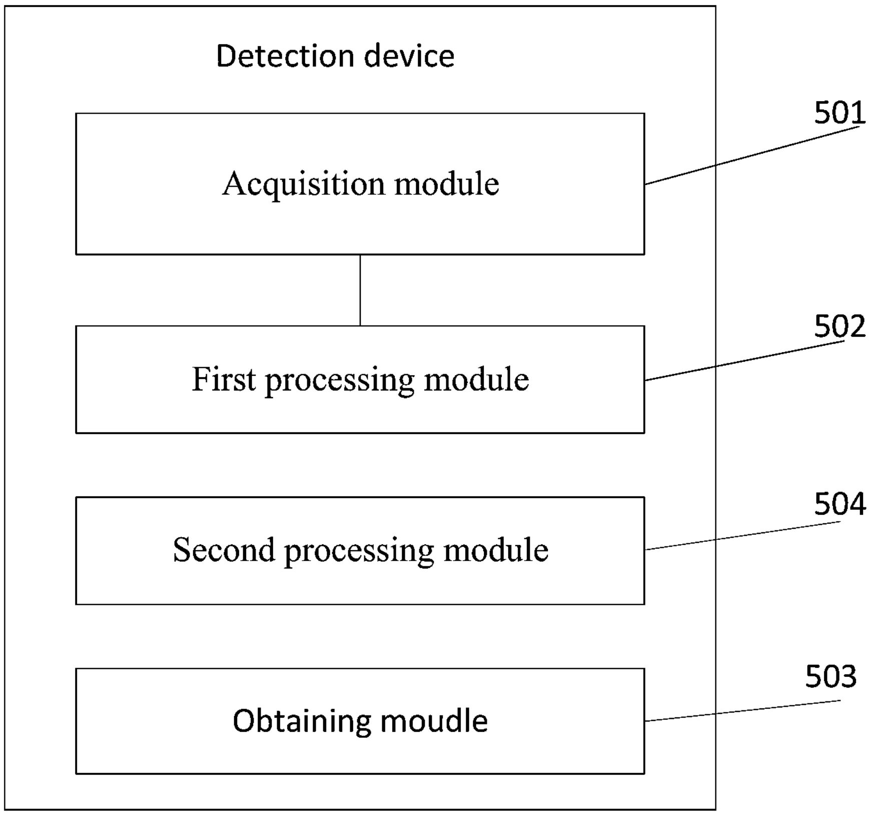
FIG. 5 is a second diagram of an apparatus for detecting a phase difference and delay of a coherent receiver according to an embodiment of the present disclosure.

FIG. 5 shows a second diagram of an apparatus for detecting a phase difference and time delay of a coherent receiver according to an embodiment of the present disclosure. As shown in FIG. 5, the apparatus comprises:

an acquisition module 501 for acquiring a first set of signals and a second set of signals output by the coherent receiver, wherein the first set of signals consists of a first signal and a second signal, and the second set of signals consists of a third signal and a fourth signal; wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

a first processing module 502 used to process the first set of signals to obtain a first phase difference corresponding to the first set of signals, and process the second set of signals to obtain a second phase difference corresponding to the second set of signals;

a second processing module 504 used to process the first set of signals to obtain a third phase difference corresponding to the first set of signals; process the second set of signals to obtain a fourth phase difference corresponding to the second set of signals;

an obtaining module 503 for obtaining a time delay of the coherent receiver based on the first phase difference, the second phase difference, the third phase difference, and the fourth phase difference.

In some embodiments, the obtaining module 503 is further used to obtain a first time delay based on the first phase difference and the second phase difference, obtain a second time delay based on the third phase difference and the fourth phase difference, and determine a mean of the first time delay and the second time delay as the time delay of the coherent receiver.

In some embodiments, the second processing module 504 is further used to perform a cross-correlation operations on the first signal and the second signal to obtain a third cross-correlation result, perform an autocorrelation operation on the second signal to obtain a third autocorrelation result, obtain the third phase difference based on the third cross-correlation result and the third autocorrelation result, perform a cross-correlation operation on the third signal and the fourth signal to obtain a fourth cross-correlation result, perform an autocorrelation operation on the fourth signal to obtain a fourth autocorrelation result, and obtain the fourth phase difference based on the fourth cross-correlation result and the fourth autocorrelation result.

The apparatus does not need to calculate the phase and wavelength of each signal, nor does it require additional compensation devices, thereby simplifying the detection steps of phase difference and time delay of coherent receivers. Moreover, the time delay detection result obtained by the apparatus is the coherent receiver's own time delay with the detection-line time delay eliminated, further improving the detection accuracy of coherent receiver time delay.

Figure 6:
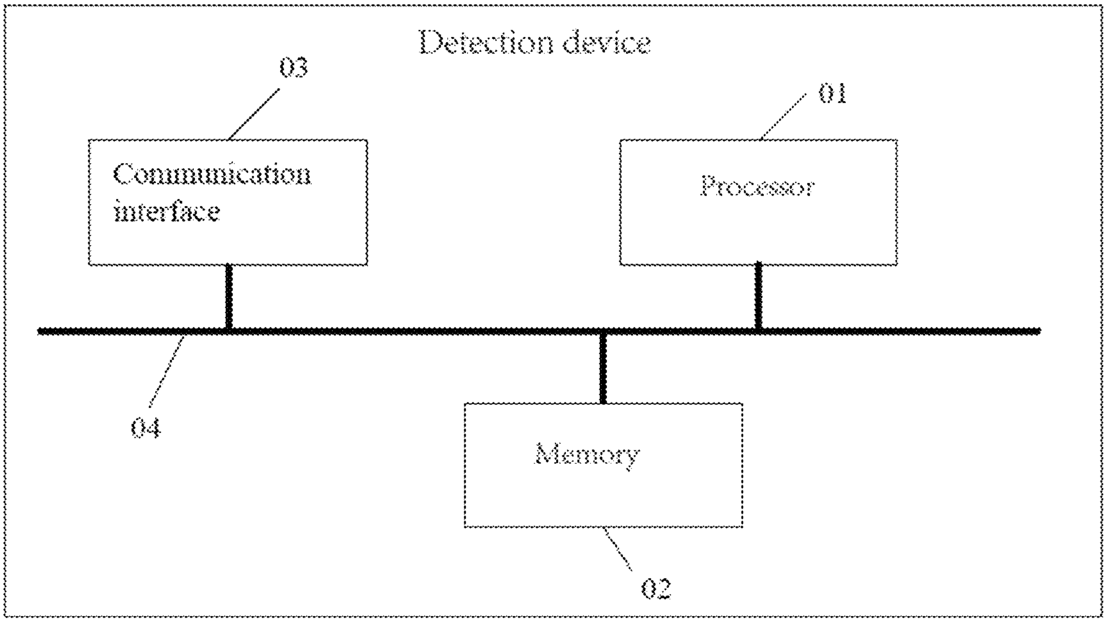
FIG. 6 is a schematic diagram of a physical structure of an apparatus for detecting a phase difference and delay of a coherent receiver according to an embodiment of the present disclosure.

FIG. 6 shows a schematic diagram of a physical structure of an apparatus for detecting a phase difference and time delay of a coherent receiver according to an embodiment of the present disclosure. As shown in FIG. 6, an embodiment of the present disclosure provides an apparatus for detecting a phase difference and time delay of the coherent receiver, which may comprise: a processor 01, a memory 02 storing instructions which could be executed by the processor 01, a communication interface 03, and a bus 04 for connecting the processor 01, memory 02, and communication interface 03, wherein the processor 01 is used to execute a program stored in the memory for phase difference and time delay detection of the coherent receiver to implement the following steps:

acquiring a first set of signals and a second set of signals output by the coherent receiver, wherein the first set of signals consists of a first signal and a second signal, and the second set of signals consists of a third signal and a fourth signal, wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

processing the first set of signals to obtain a first phase difference corresponding to the first set of signals;

processing the second set of signals to obtain a second phase difference corresponding to the second set of signals;

obtaining a phase difference and time delay of the coherent receiver based on the first phase difference and the second phase difference.

In an embodiment of the present invention, the processor 01 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It can be understood that for different devices, electronic devices used to implement the above processor functions can also be something else, and the embodiments of the present invention are not specifically limited. The terminal may also comprise the memory 02 which can be connected to processor 01, wherein the memory 02 is used to store semantic analysis program codes which comprise computer operation instructions, and the memory 02 may comprise a high-speed RAM memory or a non-volatile memory, for example, at least two disk memory.

In practical applications, the above-mentioned memory 02 may be volatile memory, such as a random access memory (RAM); or non-volatile memory, such as a read only memory (ROM), a flash memory (flash memory), a hard disk drive (HDD), or a solid state drive (SSD); or a combination of the aforementioned types of memories, and providing instructions and data to the processor 01.

In addition, in this embodiment, each functional module can be integrated into one processing unit, or each unit can physically exist separately, or two or more units can be integrated into one unit. The integrated unit mentioned above may be implemented as a hardware or a software functional module.

If the integrated unit is implemented in the form of software functional module and is not sold or used as an independent product, it can be stored in a computer-readable storage medium. Based on this understanding, the technical solution of this embodiment, which essentially contributes to the existing technology, or all or part of the technical solution, can be reflected in the form of a software product. The computer software product is stored in a storage medium, comprising several instructions to enable a computer device (which may be a personal computer, a server, or a network device, etc.) or a processor to execute all or parts of the steps of the method of this embodiment. The aforementioned storage medium comprises: a USB flash drive, a portable hard drive, a read only memory (ROM), a random access memory (RAM), a disk or a CD, and other medium that can store program codes.

An embodiment of the present disclosure provides a storage medium, wherein the computer storage medium stores computer-executable instructions thereon; and after the computer executable instructions are executed by the processor, the coherent receiver phase difference and time delay detection method provided by one or more of the aforementioned technical solutions, for example, at least one of the phase difference and time delay detection methods for coherent receiver shown in FIGS. 1 and 3, can be implemented.

In the several embodiments provided in this disclosure, it should be understood that the disclosed apparatuses and methods can be implemented in other ways. The above described embodiments of the apparatus are only illustrative. For example, the division of the modules is only a logical function division, and there may be other division methods in actual implementation, such as a combination of multiple modules or components or an integration into another system from multiple modules or components, or ignoration of some features or non-execution of some features. In addition, the coupling, direct coupling, or communication connection between the various components displayed or discussed can be indirect coupling or communication connection through some interfaces, devices or units, which can be electrical, mechanical, or other forms.

The modules mentioned above as separate components may be, or may not be physically separated. The components displayed as modules may be, or may not be physical modules, which can be located in one place or distributed across multiple network modules; and some or all modules can be selected according to actual needs to achieve the purpose of this embodiment.

In addition, in the various embodiments disclosed herein, all functional modules can be integrated into one processing module, or each module can be treated as a separate module, or two or more modules can be integrated into one module; and the integrated modules mentioned above can be implemented as both hardware modules and hardware plus software functional modules. Ordinary technical personnel in this field can understand that all or parts of the steps to implement the above method embodiments can be completed through the hardware related to program instructions. The aforementioned program can be stored in a computer-readable storage medium, and when executed, the program executes the steps comprising the above method embodiments; and the aforementioned storage medium comprise a mobile storage device, a read only memory (ROM), a random access memory (RAM), a disk or a CD, and other medium that can store program codes.

The methods disclosed in the embodiments of the several methods provided in this disclosure can be combined freely as long as no conflict occurs, to obtain new method embodiments.

The features disclosed in the several device embodiments provided in this disclosure can be combined freely to obtain new device embodiments as long as no conflict occurs.

The features disclosed in several embodiments of the methods or apparatuses provided in this disclosure can be freely combined as long as no conflict occurs, to obtain new embodiments of the methods or apparatuses.

The above is only the specific implementation method disclosed in this disclosure, but the scope of protection disclosed in this disclosure is not limited thereto in any way. Any changes or alternatives which can be easily thought of by a person skilled in the technical field within the scope of disclosure should fall within the scope of protection disclosed in this disclosure. Therefore, the scope of protection disclosed in this disclosure shall be based on the scope of protection claimed by the claims.

What is claimed is:

1. A method for detecting a phase difference and time delay of a coherent receiver, wherein the method comprises:

acquiring a first set of signals and a second set of signals output by the coherent receiver, wherein the first set of signals consists of a first signal and a second signal, and the second set of signals consists of a third signal and a fourth signal, wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

processing the first set of signals to obtain a first phase difference corresponding to the first set of signals;

processing the second set of signals to obtain a second phase difference corresponding to the second set of signals;

obtaining a phase difference and time delay of the coherent receiver based on the first phase difference and the second phase difference, wherein the processing the first set of signals to obtain a first phase difference corresponding to the first set of signals, comprises:

performing a cross-correlation operation on the first signal and the second signal to obtain a first cross-correlation result;

performing an autocorrelation operation on the first signal to obtain a first autocorrelation result;

obtaining the first phase difference corresponding to the first set of signals based on the first cross-correlation result and the first autocorrelation result; and the processing the second set of signals to obtain the second phase difference corresponding to the second set of signals, comprises:

performing a cross-correlation operation on the third signal and the fourth signal to obtain a second cross-correlation result;

performing an autocorrelation operation on the third signal to obtain a second autocorrelation result;

obtaining the second phase difference corresponding to the second set of signals based on the second cross-correlation result and the second autocorrelation result.

2. The method of claim 1, wherein the first phase difference is:

$$\varphi_{IQ} = \sin^{-1}(\text{XOR\_IQ1}/\text{XOR\_I1});$$

where $\varphi_{IQ}$ represents the first phase difference, XOR_IQ1 represents the first cross-correlation result, and XOR_I1 represents the first autocorrelation result; and the second phase difference is:

$$\varphi'_{IQ} = \sin^{-1}(\text{XOR\_IQ2}/\text{XOR\_I2});$$

where $\varphi'_{IQ}$ represents the second phase difference, XOR_IQ2 represents the second cross-correlation result, and XOR_I2 represents the second autocorrelation result.

3. The method of claim 2, wherein the phase difference of the coherent receiver is:

$$\varphi_{Hybrid} = \frac{f_2}{f_2 - f_1}\varphi_{IQ} - \frac{f_1}{f_2 - f_1}\varphi'_{IQ};$$

where $\varphi_{Hybrid}$ represents the phase difference, $f_1$ represents the first frequency shift, $f_2$ represents the second frequency shift, $\varphi_{IQ}$ represents the first phase difference, and $\varphi'_{IQ}$ represents the second phase difference.

4. The method of claim 2, wherein the time delay of the coherent receiver is:

$$\tau = \frac{\varphi'_{IQ} - \varphi_{IQ}}{f_2 - f_1};$$

where $\tau$ represents the time delay, $f_1$ represents the first frequency shift, $f_2$ represents the second frequency shift, Pro represents the first phase difference, and $\varphi'_{IQ}$ represents the second phase difference.

5. The method of claim 1, wherein the method further comprises:

processing the first set of signals to obtain a third phase difference corresponding to the first set of signals;

processing the second set of signals to obtain a fourth phase difference corresponding to the second set of signals; and the obtaining the time delay of the coherent receiver based on the first phase difference and the second phase difference, comprises:

obtaining the time delay of the coherent receiver based on the first phase difference, the second phase difference, the third phase difference, and the fourth phase difference.

6. The method of claim 5, wherein the obtaining the time delay of the coherent receiver based on the first phase difference, the second phase difference, the third phase difference, and the fourth phase difference, comprises:

obtaining a first time delay based on the first phase difference and the second phase difference;

obtaining a second time delay based on the third phase difference and the fourth phase difference;

determining a mean of the first time delay and the second time delay as the time delay of the coherent receiver.

7. The method of claim 5, wherein the processing the first set of signals to obtain a third phase difference corresponding to the first set of signals, comprises:

performing a cross-correlation operation on the first signal and the second signal to obtain a third cross-correlation result;

performing an autocorrelation operation on the second signal to obtain a third autocorrelation result;

obtaining the third phase difference based on the third cross-correlation result and the third autocorrelation result; and the processing the second set of signals to obtain a fourth phase difference corresponding to the second set of signals, comprises:

performing a cross-correlation operation on the third signal and the fourth signal to obtain a fourth cross-correlation result;

performing an autocorrelation operation on the fourth signal to obtain a fourth autocorrelation result;

obtaining the fourth phase difference based on the fourth cross-correlation result and the fourth autocorrelation result.

8. The method of claim 1, wherein a polarization state of the one path of optical signal after splitting is different from that of the another path of optical signal after splitting and then the first frequency shift; and a polarization state of the one path of optical signal after splitting is different from that of the another path of optical signal after splitting and then the second frequency shift.

9. The method of claim 1, wherein the sampling frequency of the first set of signals is an integer multiple of the first frequency shift, and the sampling frequency of the second set of signals is an integer multiple of the second frequency shift.

10. The method of claim 1, wherein the first set of signals and the second set of signals are amplitude normalized signals.

11. An apparatus for detecting a phase difference and time delay of a coherent receiver, wherein the apparatus comprises:

a memory used to store computer executable instructions; and a processor connected to the memory for implementing a method for detecting a phase difference and time delay of a coherent receiver by executing the computer executable instructions, wherein the method comprises:

acquiring a first set of signals and a second set of signals output by the coherent receiver, wherein the first set of signals consists of a first signal and a second signal, and the second set of signals consists of a third signal and a fourth signal, wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

processing the first set of signals to obtain a first phase difference corresponding to the first set of signals;

processing the second set of signals to obtain a second phase difference corresponding to the second set of signals;

obtaining a phase difference and time delay of the coherent receiver based on the first phase difference and the second phase difference, wherein the processing the first set of signals to obtain a first phase difference corresponding to the first set of signals, comprises:

performing a cross-correlation operation on the first signal and the second signal to obtain a first cross-correlation result;

performing an autocorrelation operation on the first signal to obtain a first autocorrelation result;

obtaining the first phase difference corresponding to the first set of signals based on the first cross-correlation result and the first autocorrelation result; and the processing the second set of signals to obtain the second phase difference corresponding to the second set of signals, comprises:

performing a cross-correlation operation on the third signal and the fourth signal to obtain a second cross-correlation result;

performing an autocorrelation operation on the third signal to obtain a second autocorrelation result;

obtaining the second phase difference corresponding to the second set of signals based on the second cross-correlation result and the second autocorrelation result.

12. A non-transitory computer-readable storage medium, the medium storing computer executable instructions thereon, wherein after the computer executable instructions are executed by a processor, a method for detecting a phase difference and time delay of a coherent receiver is implemented, wherein the method comprises:

acquiring a first set of signals and a second set of signals output by the coherent receiver, wherein the first set of signals consists of a first signal and a second signal, and the second set of signals consists of a third signal and a fourth signal, wherein the first set of signals are signals processed by the coherent receiver on one path of optical signal after splitting and another path of optical signal after splitting and then a first frequency shift, and the second set of signals are signals processed by the coherent receiver on one path of optical signal after splitting and another path of optical signal after splitting and then a second frequency shift, wherein the first frequency shift is different from the second frequency shift;

processing the first set of signals to obtain a first phase difference corresponding to the first set of signals;

processing the second set of signals to obtain a second phase difference corresponding to the second set of signals;

obtaining a phase difference and time delay of the coherent receiver based on the first phase difference and the second phase difference, wherein the processing the first set of signals to obtain a first phase difference corresponding to the first set of signals, comprises:

performing a cross-correlation operation on the first signal and the second signal to obtain a first cross-correlation result;

performing an autocorrelation operation on the first signal to obtain a first autocorrelation result;

obtaining the first phase difference corresponding to the first set of signals based on the first cross-correlation result and the first autocorrelation result; and the processing the second set of signals to obtain the second phase difference corresponding to the second set of signals, comprises:

performing a cross-correlation operation on the third signal and the fourth signal to obtain a second cross-correlation result;

performing an autocorrelation operation on the third signal to obtain a second autocorrelation result;

obtaining the second phase difference corresponding to the second set of signals based on the second cross-correlation result and the second autocorrelation result.

13. The apparatus of claim 11, wherein the first phase difference is:

$$\varphi_{IQ} = \sin^{-1}(XOR\_IQ1/XOR\_I1);$$

where $\varphi_{IQ}$ represents the first phase difference, XOR_IQ1 represents the first cross-correlation result, and XOR_I1 represents the first autocorrelation result; and the second phase difference is:

$$\varphi_{Hybrid} = \frac{f_2}{f_2 - f_1}\varphi_{IQ} - \frac{f_1}{f_2 - f_1}\varphi'_{IQ};$$

where $\varphi'_{IQ}$ represents the second phase difference, XOR_IQ2 represents the second cross-correlation result, and XOR_I2 represents the second autocorrelation result.

14. The apparatus of claim 13, wherein the phase difference of the coherent receiver is:

$$\varphi'_{IQ} = \sin^{-1}(XOR\_IQ2/XOR\_I2);$$

where $\varphi_{Hybrid}$ represents the phase difference, $f_1$ represents the first frequency shift, $f_2$ represents the second frequency shift, $\varphi_{1Q}$ represents the first phase difference, and $\varphi'_{IQ}$ represents the second phase difference.

15. The apparatus of claim 13, wherein the time delay of the coherent receiver is:

$$\tau = \frac{\varphi'_{IQ} - \varphi_{IQ}}{f_2 - f_1};$$

where $\tau$ represents the time delay, $f_1$ represents the first frequency shift, $f_2$ represents the second frequency shift, $\varphi_{IQ}$ represents the first phase difference, and $\varphi'_{IQ}$ represents the second phase difference.

16. The non-transitory computer-readable storage medium of claim 14, wherein the first phase difference is:

$$\varphi_{IQ} = \sin^{-1}(XOR\_IQ1/XOR\_I1);$$

where $\varphi_{IQ}$ represents the first phase difference, XOR_IQ1 represents the first cross-correlation result, and XOR_I1 represents the first autocorrelation result; and the second phase difference is:

$$\varphi'_{IQ} = \sin^{-1}(XOR\_IQ2/XOR\_I2);$$

where $\varphi'_{IQ}$ represents the second phase difference, XOR_IQ2 represents the second cross-correlation result, and XOR_I2 represents the second autocorrelation result.

17. The non-transitory computer-readable storage medium of claim 16, wherein the phase difference of the coherent receiver is:

$$\varphi_{Hybrid} = \frac{f_2}{f_2 - f_1}\varphi_{IQ} - \frac{f_1}{f_2 - f_1}\varphi'_{IQ};$$

where $\varphi_{Hybrid}$ represents the phase difference, $f_1$ represents the first frequency shift, $f_2$ represents the second frequency shift, $\varphi_{IQ}$ represents the first phase difference, and $\varphi'_{IQ}$ represents the second phase difference.

* * * * *